(12) United States Patent
Zhao et al.

(10) Patent No.: US 6,980,954 B1
(45) Date of Patent: Dec. 27, 2005

(54) SEARCH METHOD BASED ON SINGLE TRIPHONE TREE FOR LARGE VOCABULARY CONTINUOUS SPEECH RECOGNIZER

(75) Inventors: Quingwei Zhao, Beijing (CN); Zhiwei Lin, Singapore (SG); Yonghong Yan, Beijing (CN); Baosheng Yuan, Singapore (SG)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 10/130,857

(22) PCT Filed: Sep. 30, 2000

(86) PCT No.: PCT/CN00/00302

§ 371 (c)(1),
(2), (4) Date: Feb. 6, 2003

(87) PCT Pub. No.: WO02/29615

PCT Pub. Date: Apr. 11, 2002

(51) Int. Cl.[7] .......................... G10L 15/04; G06F 17/20
(52) U.S. Cl. ...................... 704/251; 704/255; 704/256
(58) Field of Search ............................... 703/200, 251, 703/256, 275; 704/251, 255, 256

(56) References Cited

U.S. PATENT DOCUMENTS

| | | | | |
|---|---|---|---|---|
| 5,621,859 A | * | 4/1997 | Schwartz et al. | 704/256 |
| 5,819,222 A | * | 10/1998 | Smyth et al. | 704/256 |
| 6,064,959 A | * | 5/2000 | Young et al. | 704/251 |

FOREIGN PATENT DOCUMENTS

| | | | |
|---|---|---|---|
| CN | 1180202 A | 4/1998 | |
| EP | 0750293 A2 | 12/1996 | |
| EP | 0942409 A2 | 9/1999 | |

OTHER PUBLICATIONS

Search Report for PCT/CN00/00302; mailed Apr. 12, 2001; 2 pages.

Ney, H. and Ortmanns, S., "*Dynamic Programming Search for Continuous Speech Recognition*", IEEE Signal Processing Magazine, vol. 16, No. 5, pp. 64-83, Sep. 1999.

Nguyen, L. and Schwartz, R., "*The BBN Single-Phonetic-Tree Fast-Match Algorithm*", Proc. Int. Conf. Spoken Language Processing, vol. 5, Sydney, Australia, pp. 1827-1830, Dec. 1998.

Odell, J.J., Valtchev, V., Woodland, P.C., and Young, S.J., "*A One Pass Decoder Design for Large Vocabulary Recognition*", Proc Human Language Technology Workshop, pp. 405-410, Plainsboro NJ, Morgan Kaufman Publishers Inc, 1994.

S. J. Young, N. H. Rusell, and J. H. S. Thornton, "*Token Passing: a Conceptual model for Connected Speech Recognition*", Cambridge University Engineering Dept, CUED/F-INFENG/TR38, pp. 1-23, 1989.

* cited by examiner

*Primary Examiner*—Susan McFadden
(74) *Attorney, Agent, or Firm*—Blakely, Sokoloff, Taylor & Zafman LLP

(57) ABSTRACT

A search method based on a single triphone tree for large vocabulary continuous speech recognizer is disclosed in which speech signal are received. Tokens are propagated in a phonetic tree to integrate a language model to recognize the received speech signals. By propagating tokens, which are preserved in tree nodes and record the path history, a single triphone tree can be used in a one pass searching process thereby reducing speech recognition processing time and system resource use.

12 Claims, 5 Drawing Sheets

SEARCH METHOD BASED ON SINGLE TRIPHONE TREE FOR LARGE VOCABULARY CONTINUOUS SPEECH RECOGNIZER

FIELD OF THE INVENTION

The present invention relates generally to speech processing and to large vocabulary continuous speech recognition (LVCSR) systems. More particularly, the present invention relates to a search method based on single triphone tree for large vocabulary continuous speech recognizer.

BACKGROUND OF THE INVENTION

A speech recognition system recognizes a collection of spoken words ("speech") into recognized phrases or sentences. A spoken word typically includes one or more phones or phonemes, which are distinct sounds of a spoken word. Thus, to recognize speech, a speech recognition system must not only employ the acoustic nature of the speech, but must also utilize the relationships between the words in the speech. A common way of representing the acoustic nature of the speech is by using an acoustical model such as a hidden markov model (HMM). A common way of representing the relationships between words in recognizing speech is by using a language model.

Typically, a HMM uses a series of transitions from state to state to model a letter, a word, or a sentence. Each state can be referred to a phone or a triphone (phone having a left and right context). Each arc of the transitions has an associated probability, which gives the probability of the transition from one state to the next at an end of an observation frame. As such, an unknown speech signal can be represented by ordered states with a given probability. Moreover, words in an unknown speech signal can be recognized by using the ordered states of the HMM.

To improve speech recognition accuracy, language models can be used in conjunction with an acoustical model such as the HMM. A language model specifies the probability of speaking different word sequences. Examples of language models are N-gram probabilistic grammars, formal grammars, and N-grams of word classes. Typically, the models are represented as a phonetic tree structure wherein all of the words that are likely to be encountered reside at the ends of branches or at nodes in the tree. Each branch represents a phoneme. All the words that share the same first phoneme share the same first branch, and all words that share the same first and second phonemes share the same first and second branches, and so on.

A common type of phonetic tree is a triphone tree. A triphone is a phoneme having a left phoneme context and right phoneme context. Thus, a triphone assumes that the way a phoneme is pronounced depends on its neighboring phoneme contexts. To recognize large continuous speech, a first word can be recognized using a triphone tree. Typically, to recognize a second word while maintaining a relationship with the first word, the triphone tree related to the first word must be copied. Hence, a disadvantage of the triphone tree copying technique is the redundant copying of triphone trees to recognize words thereby causing speech recognition process to be slow and large amounts of memory to be consumed.

Another technique uses a single triphone tree fast match algorithm to avoid copying of triphone trees. This technique is typically used as a forward pass of a forward/backward recognition process. That is, a second pass must be employed for obtaining higher speech recognition accuracy. In particular, the first pass serves only as a fast match operation and its purpose is to keep the likely word endings in guiding the second pass. Thus, a disadvantage of this technique is that it must be followed by an additional second pass beam search process that requires additional processing time and resource use.

BRIEF DESCRIPTION OF THE DRAWINGS

The features and advantages of the present invention are illustrated by way of example and not intended to be limited by the figures of the accompanying drawings in which like references indicate similar elements, and in which.

DETAILED DESCRIPTION

According to one aspect of the present invention, a search method based on a single triphone tree for large vocabulary continuous speech recognizer is disclosed in which speech signals are received. Tokens are propagated in a phonetic tree to integrate a language model to recognize the received speech signals.

The speech processing techniques described herein can provide high speech recognition accuracy by propagating tokens. By propagating tokens, which are preserved in tree nodes and can record a path history, a single triphone tree can be used in a one pass searching process thereby reducing speech recognition processing time and system resource use.

Figure 1:
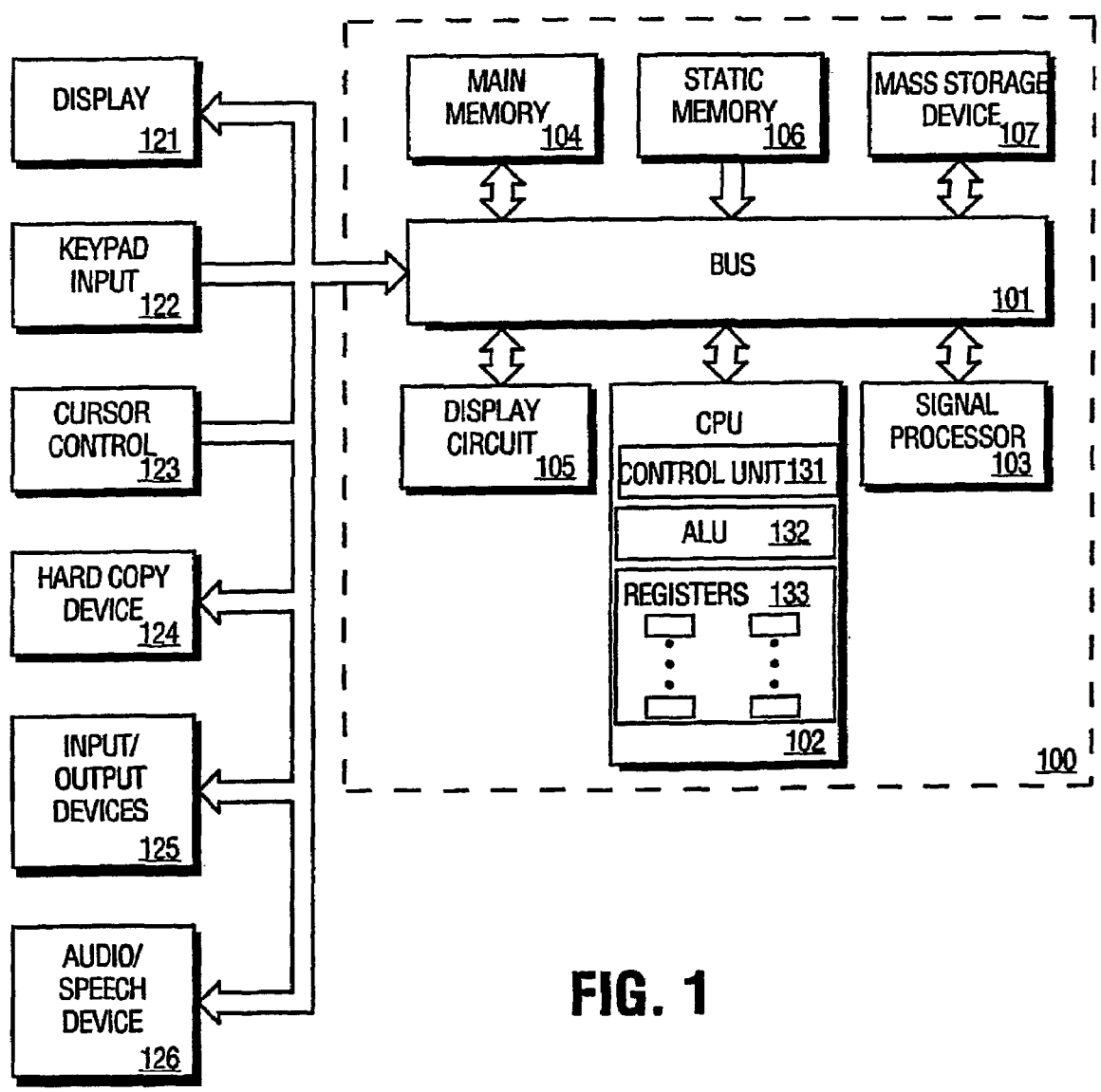
FIG. 1 is a diagram illustrating an exemplary digital processing system for implementing the present invention.

FIG. 1 is a diagram illustrating an exemplary digital processing system 100 for implementing the present invention. The speech processing and speech recognition techniques described herein can be implemented and utilized within digital processing system 100, which can represent a general purpose computer, portable computer, hand-held electronic device, or other like device. The components of digital processing system 100 are exemplary in which one or more components can be omitted or added. For example, one or more memory devices can be utilized for digital processing system 100.

Referring to FIG. 1, digital processing system 100 includes a central processing unit 102 and a signal processor 103 coupled to a display circuit 105, main memory 104, static memory 106, and mass storage device 107 via bus 101. Digital processing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for digital processing system 100. CPU 102 or signal processor 103 or both can be used to process information and/or signals for digital processing system 100. Signal processor 103 can be used to process speech or audio information and signals for speech processing and recognition. Alternatively, CPU 102 can be used to process speech or audio information and signals for speech processing or recognition. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. For example, main memory 104 may store speech or audio information and instructions to be executed by signal processor 103 to process the speech or audio information. Main memory 104 may also store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for digital processing system 100.

Display 121 can be, e.g., a cathode ray tube (CRT) or liquid crystal display (LCD). Display device 121 displays information or graphics to a user. Digital processing system 101 can interface with display 121 via display circuit 105. Keypad input 122 is a alphanumeric input device for communicating information and command selections to digital processing system 100. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to digital processing system 100. For example, a speaker can be coupled to digital processing system 100. Audio/speech device 126 can be, e.g., a microphone with an analog to digital converter, for capturing sounds of speech in an analog form and transforming the sounds into digital form, which can be used by signal processor 203 and/or CPU 102, for speech processing or recognition.

The speech processing and speech recognition techniques described herein can be implemented by hardware and/or software contained within digital processing system 100. For example, CPU 102 or signal processor can execute code or instructions stored in a machine-readable medium, e.g., main memory 104, to process or to recognize speech.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 2:
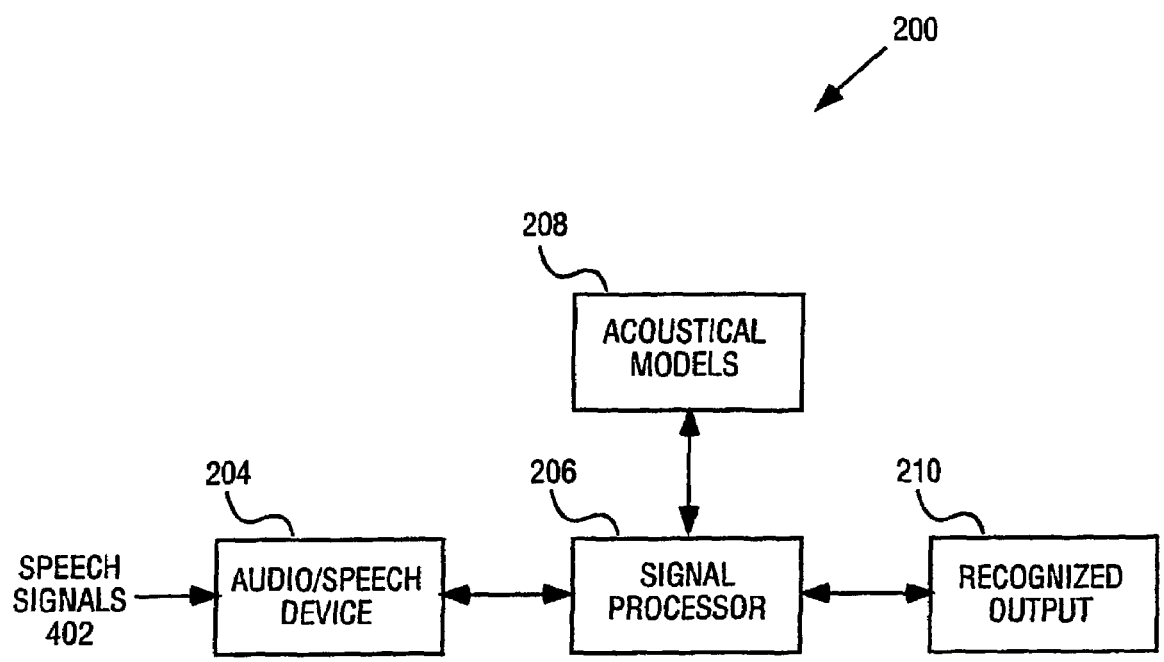
FIG. 2 is a block diagram illustrating a speech processing system according to one embodiment.

FIG. 2 is a block diagram of a speech processing system 200 according to one embodiment. The speech recognition system can be implemented, e.g., in digital processing system 100 as described in FIG. 1. Referring to FIG. 2, block diagram 200 includes an audio/speech device 204 for receiving and processing speech signals 202 and a signal processor 206 for processing speech signals 402 from audio/speech device 204.

Audio/speech device 204 is an audio and speech receiving mechanism. For example, audio/speech device 204 can be a microphone. A user can speak into audio/speech device 203 in which acoustics (i.e., analog signals) are provided to audio/speech device 203. Audio/speech device 204 can convert the analog signals (i.e., speech signals 202) into digital form.

Signal processor 206 is a processing device, which can be used during a training process or a continuous speech recognition process. During a training process, signal processor 206 builds relationships for the words contained in speech signals 202 to create acoustical models 208. For example, acoustical models 208 can be based on a hidden markov model (HMM). Alternatively, acoustical models 208 can be language models. During a speech recognition process, signal processor 206 receives unknown speech signals 202. Signal processor 206 searches the acoustical models 208 and/or language models to match words in the unknown speech signals with known states in the models. For example, signal processor 206 can use a search method based on a single triphone by propagating tokens as explained in FIG. 5. If words in the unknown speech signals match known states of the models (i.e., a single triphone tree model), processor 206 can output a recognized output such as a text file including known words, phrases, or sentences.

Figure 3:
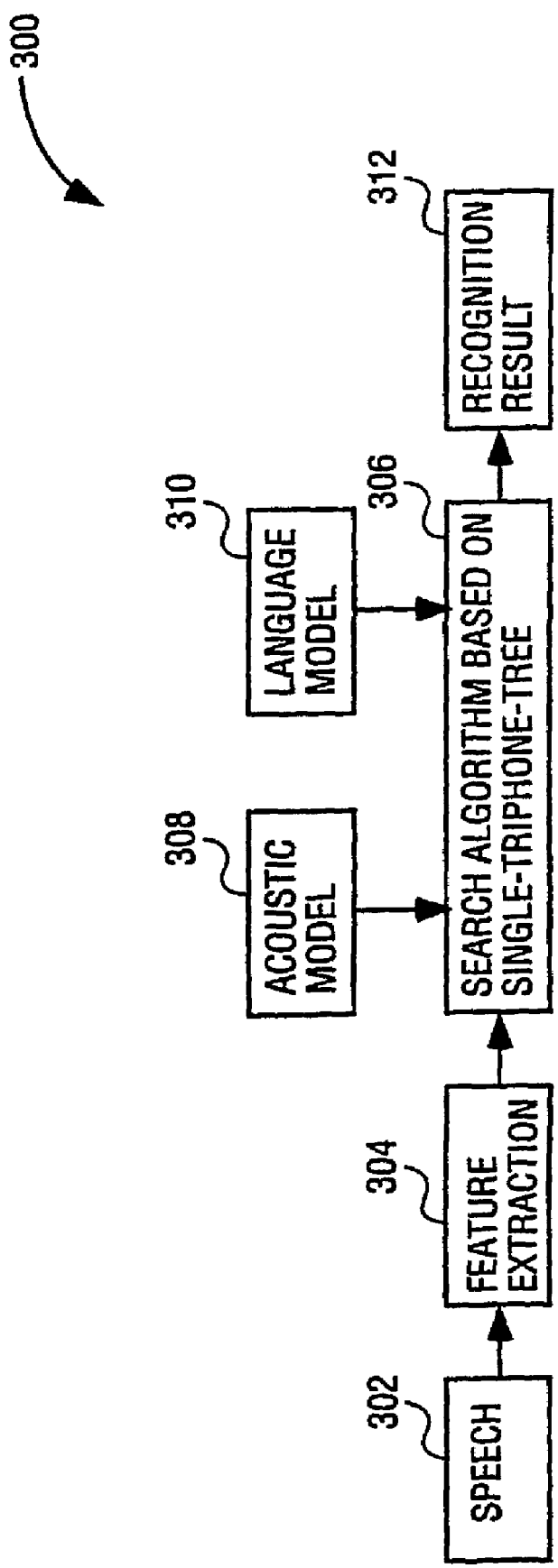
FIG. 3 is a functional flow diagram illustrating an operation for a large vocabulary continuous speech recognition system according to one embodiment.

FIG. 3 is a functional flow diagram illustrating an operation 300 for a large vocabulary continuous speech recognition system according to one embodiment. For example, system 100 or 200 can be used to perform the operations as illustrated in FIG. 3. Referring to FIG. 3, at functional block 302, speech is received from a user. For example, a user may input continuous speech into a microphone, which is connected to a speech recognition system. At functional block 304, a feature extraction process is performed on the inputted speech obtained from functional block 302. For example, mel-scale frequency cepstrum coefficients (MFCC) are extracted from the speech to recognize words in continuous speech.

At functional block 306, a single triphone tree search algorithm based on token propagation can be used to determine unknown words in speech 302. In addition, at functional blocks 308 and 310, acoustic models and language models may be used for the search algorithm of functional block 306. For example, at function block 306 an operation such as that described below with regards to the pseudo code and operation 500 as described in FIG. 5 may be used for the search algorithm. After the search process is performed, at functional block 312, a recognition result can be obtained. A recognition result can be a text file or output of text on a display.

The single triphone tree search algorithm based on token propagation creates tokens as soon as continuous speech is received. A token refers to an active partial path, which starts from the beginning of the continuous speech. The tokens move from the root to nodes to leaves. Hence, the tokens are propagated within words so that a path history is recorded and saved in the tokens. When the tokens reach the leaves, a new word is found and the tokens are changed to record the history of new words. The tokens then merge, that is, all the tokens are deleted which have a low matching probability, and all the tokens that have a higher matching probability are reserved in a tokens list form or a tokens link form. The tokens travel back to the root again until all phones have been recognized. A matching probability is calculated for all possible tokens and then a best token is chosen to recognize the meaning of the continuous speech.

The following is exemplary pseudo code for the search algorithm, which may be used for functional block 306. The pseudo code is implemented with a single triphone tree. The pseudo code can be implemented using known programming languages such as "C" or "C++".

```
                Main flow of search algorithm

InitPropation( );
                    //Following is the main body of Propagating Token.
                    For(t=1;t<endFrame;t++){
                        for (each level of tree){
                            for (each active node){
                                PropHMMState(node);
                            }
                        }
                        PropWordEntry( );
                        PropTokenMerge( );
                    }
                    EndPropagation( );
                Implementation of above main module in detail:

PropHMMState(node)
{
For state 0,
    PropHMMExternal(node);
For(each state I in this node){
    For(each token in the token link of state I){
        For(each of the state J that state I can jumped to){
            Update probability ap=tokenInk->p + transition probability +
            observation probability;
            If(ap can exceed the pruning threshold)
                Generate new token, and add this new token to the token
                link of state j;
            }
        }
    }
}
                        PropHMMExternal(node)

{
    For(every triphone node j that following current node){
        Update probability ap = tokenInk->p + state transition
probability + state observation probability;
        If(ap can exceed the pruning threshold){
            Compute Language model lookahead probability plmla;
            If(probability+plmla can exceed the lookahead pruning
threshold)
                Generate new token and add this token to the tokenlink of
state 0 of node j
        }
    }
}
                        PropWordEntry( )

{
    For(each of the leaf (or word end node) in the tree){
        For(each of the tokens that belongs to the token link of this node x)
            Add Language model probability to this node, according to
the WLR of this token;
        For(each of the first level tree node y){
            Find those tokens that belong to current node x and that
can propagate to y;
            Find the N best tokens and ad them to one WLR structure wlr;
                Generate one new token and attach the wlr to this token,
thus the new token can remember the best possible predecessor words
in the trace back history;
        }
    }
}
                        PropTokenMerge( )

{
    For(all of the active states)
        For(the token link that belongs to this state){
            Cluster all the tokens in the token link to different categories,
every category corresponds to one acoustic context.
            For(each sub token link in one category){
                Collect those tokes that have the same predecessor word,
only keep one best token from these tokens and discard all the other
tokens;
            }
        }
}
```

```
                        EndPropagation( )

{
    For(all of the word end nodes){
        Final special processing of those nodes;
            Get local N-best result according to information from each of
the token links of those nodes, Add N-best result to candidates pool;
    }
    Get global N-best result from the cadidates pool.
}
```

Figure 4:
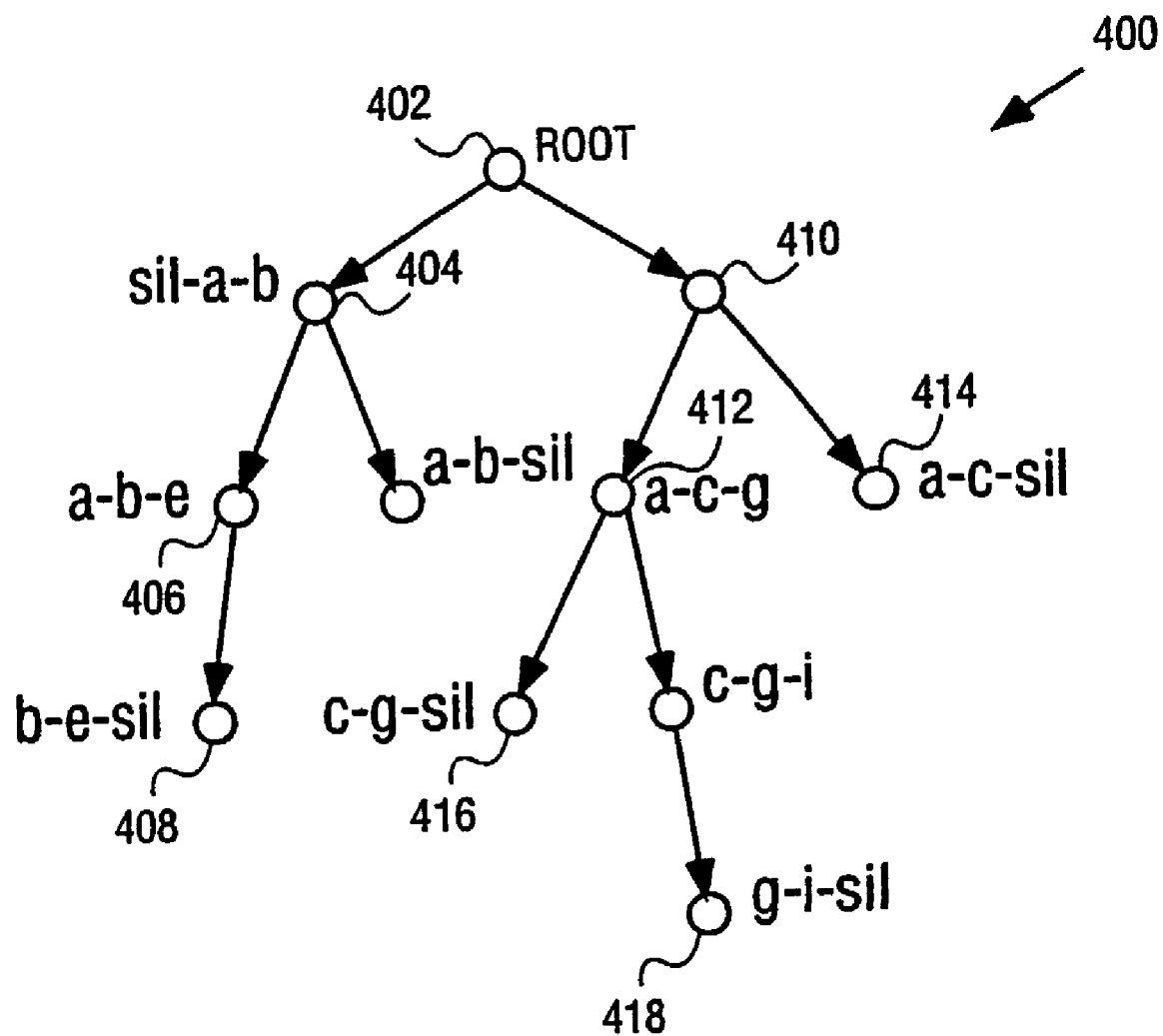
FIG. 4 is an exemplary single triphone tree to illustrate a single triphone tree search process.

FIG. 4 is an exemplary single triphone tree 400 to illustrate a single triphone tree search process. Referring to FIG. 4, the single triphone tree 400 includes a plurality of nodes 402 through 418. Each of the nodes can, be a triphone HMM model and node 402 is the root node for the triphone tree.

In the example of FIG. 4, the single triphone tree 400 assumes a vocabulary that includes the following five words, "abe", "ab", "acg", "acgi" and "ac." For the single triphone tree search algorithm based on token propagation, the tokens are propagated through the lexicon tree and a matching probability score is calculated for each of the tokens. The decoding result can thus be obtained from the tokens with the best matching score. By using tokens, history information is recorded in the tokens, which makes it possible for a single triphone tree to be used instead of having to make redundant tree copies.

Figure 5:
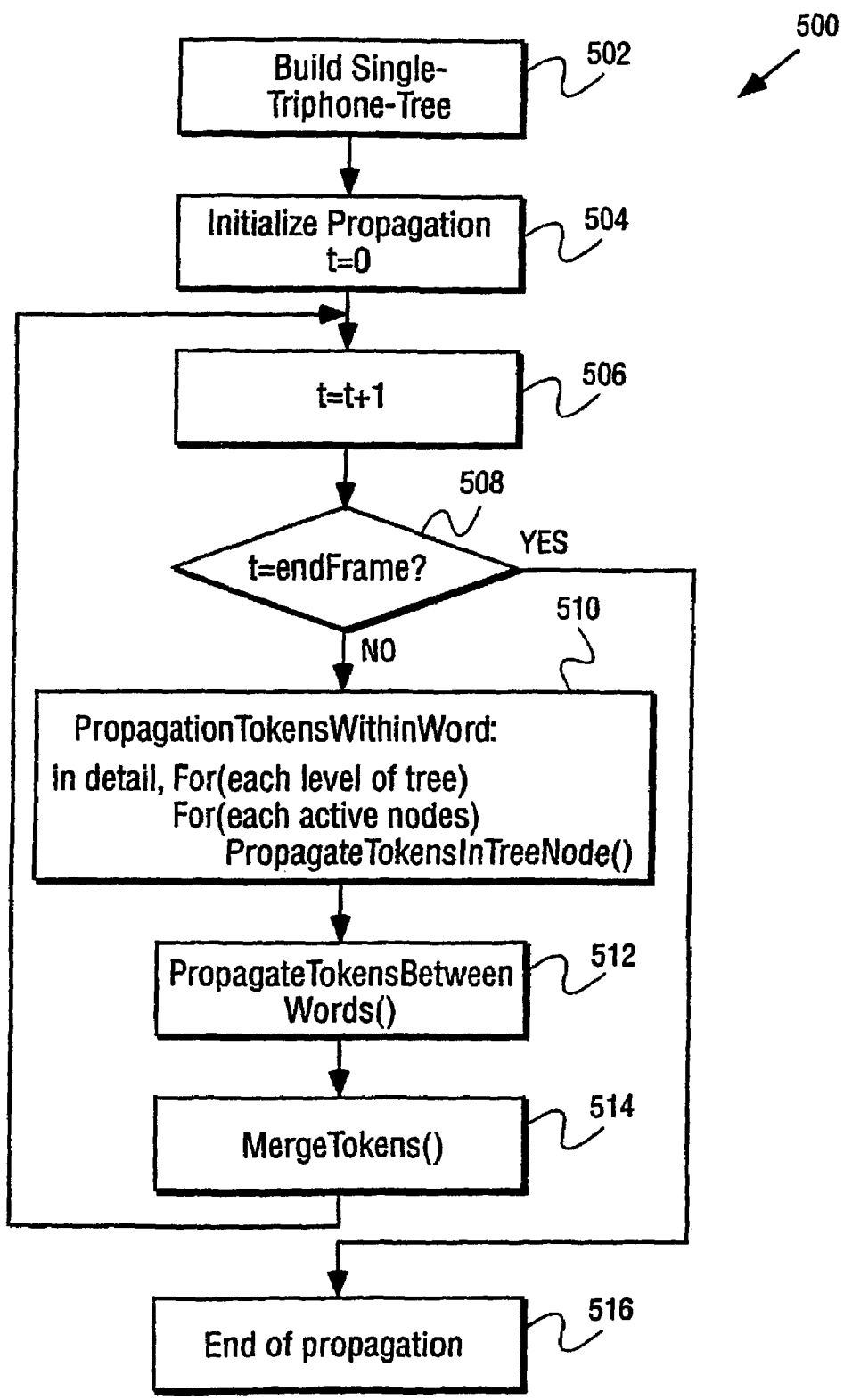
FIG. 5 is a flow chart illustrating a single triphone tree search operation according to one embodiment.

FIG. 5 is a flow chart illustrating a single triphone tree search operation 500 according to one embodiment. For purposes of explanation, operation 500 begins at operation 502. Referring to FIG. 5, at operation 502, a single triphone tree is built. For example, a triphone tree such as that shown FIG. 4 can be built. The triphone tree can be built prior to recognizing continuous speech.

At operation 504, a time variable "t" is set to 0 for propagation, which is at the beginning of receiving continuous speech.

At operation 506, the time variable is incremented. For example, the time variable can be incremented every 10 seconds.

At operation 508, a determination is made if the time variable t=an end of frame value. If the time variable does equal the end of frame value, operation 500 continues to operation 516. At operation 516, token propagation ends.

At operation 510, if the time variable does not equal the end of frame value, tokens within a word are propagated. For example, tokens within the word at each level are propagated and tokens within the word for each active node is propagated within the tree.

A token contains two basic elements: (1) path score and (2) path history. For any state "s" of the triphone tree node "d" at time "t", there is one token list corresponding to it. One token list refers to a group of tokens that can propagate to a current state from all the possible transition states:

Tklist(i)  $1 \leq i \leq N$

The path score of Tklist(i) is: Q(t,d,s',i)

The path history of it is: B(t,d,s',i) (it is in WLR format)

Path extension in decoding process can be represented by propagating tokens through the triphone tree.

For the path extension between states in one node (for example, from state s' to s), the following is calculated to propagate tokens within words:

$$Q=Q(t,d,s',i)+P(s/s')+b(O_t/s)$$

if(Q>Q_{AC}(t)·f_{AC}){
   Generate new Token=(Q, B(t,d,s,i));
   Add this token into TokenList of state j;
} where $Q_{A,C}(t)$ is the best score in frame t, and $f_{AC}$ is pruning threshold.

At operation 512, tokens between words are propagated.

Every leaf node in the triphone tree corresponds to one pronunciation of a word. Propagating tokens between words refers to propagation from word-end (we) nodes of the tree to the first level triphone node in the tree. Generally, the following three operations are performed for the tokens that belong to the leaf node:

1) Add a language model probability to each token: (Q(t,d,S,i), B(t,d,S,i)) (S is the end state of the node) The history word list can be extracted from the structure B(t,d,S,i). In the instance if the previous words in the path history of this token are $w_1, w_2$ and current word is $w_3$, then LM prob $P(w/w_1, w_2)$ will be added to Q(t,d,S,i):

$$Q=Q(t,d,S,i)+P(w_3/w_1,w_2)$$

2) Generate one new token

The new path history will be generated by this operation, which is integrating all of the path history from the token lists of the (we) node to one new path history $B_{WE}(t,d)$, which can remember all the tokens history that belongs to this sate. In other words, by tracing back of $B_{WE}(t,d)$, the original N token history of B(t,d,S,i) can be retrieved.

3) Propagate the token from the leaf node d: (a–b+c) to the first level tree node.

For each of the first level node X(c–x+*), which can be reached by the we node according to the acoustic model rules:

Firstly compute the path score:

$$Q=Q(t,d,s',i)+P(s=0/s'=-1)+b(O_t/s=0)$$

if(Q>Q_{AC}(t)·f_{AC}){
   Generate new Token=(Q,B_{WE}(t,d));
   Add this token into TokenList of first state of node X.

At operation 514, the tokens are thus merged and the operation 500 continues at operation 506 until the variable t equals an end of frame number value.

Here, one "merge" operation is needed for every token. For the token list "Tklist" corresponding to one (active) state, all the tokens are clustered to sub token list corresponding to different categories, that is, under different acoustical contexts. This is represented as $TkList_c$, $1 \leq c \leq C$. (if there are C categories total, then c refers to the acoustical context in terms of a cross-word model).

The sub token list $Tklist_c$ can be further clustered into different sub-links which are under same language context. That is, collect those tokens into one sub-list that have the same predecessor word list history, for instance, if a bigram is used in the search process, the predecessor word (can be obtained by trace back the B structure) for the sub tokens list should be the same word $W_1$. If a trigram is used in the search process, then two previous word for the sub tokens list should be the same $W_1, W_2$.

For the sub token list $Tklist_{c,w1}$ or $Tklist_{c,w1,cw2}$, only one best token (which has the highest matching score among these tokens) is needed to be preserved and all the other tokens can be discarded, that is, $$Tok_{best} = \arg\max_i \{ Tklist_{c,w_1,w_2}(i) \rightarrow Q \};$$

By this kind of Merge operation, the bigram (or trigram) language model is integrated into the search process without using tree copies.

Thus, a search method based on single triphone tree for large vocabulary continuous speech recognizer has been described. Furthermore, improvements in search algorithm for large vocabulary continuous speech recognition task have been described. A single triphone tree search technique has been described that can be used in place of the traditional tree-copy technique, which simplifies search computation and consumes less memory. A token propagation technique has been described that can attain high continuous speech recognition accuracy with one pass.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A speech processing method comprising:
   receiving speech signals; and
   propagating tokens in a single triphone phonetic tree to recognize the received speech signals, wherein propagating tokens comprises:
   initializing the tokens in the phonetic tree;
   propagating the tokens within words of the phonetic tree;
   propagating the tokens between words of the phonetic tree; and
   merging the tokens.

2. The method of claim 1, wherein propagating the tokens within words includes:
   propagating the tokens in each node of the phonetic tree.

3. The method of claim 1, wherein propagating the tokens between words includes:
   adding a language model probability to each leaf node token of the phonetic tree;
   generating a new token to remember a new path history by integrating all path history of the tokens; and
   propagating the new token from the leaf node to a root note of a phonetic tree.

4. The method of claim 1, wherein merging the tokens includes:
   preserving a best matching token and deleting other tokens.

5. A speech processing system comprising:
   a receiving unit to receive speech signals; and
   a processing unit to propagate tokens in a single triphone phonetic tree to recognize the received speech signals, wherein to propagate tokens comprises:
   initialize the tokens in the phonetic tree,
   propagate the tokens within words of the phonetic tree,
   propagate the tokens between the words of the phonetic tree, and
   merge the tokens.

6. The system of claim 5, wherein the processor is to propagate the tokens in each node of the phonetic tree.

7. The system of claim 5, wherein the processor to propagate the tokens between words comprises the processor to add a language model probability to each leaf node token of the phonetic tree, generate a new token to remember a new path history by integrating all path history of the tokens, and propagate the new token from the leaf node to a root note of a phonetic tree.

8. The system of claim 5, wherein the processor is to preserve a best matching token and to delete the other tokens.

9. A machine-readable medium that provides instructions, which if executed by a processor, cause the processor to perform the operation comprising:
   receiving speech signals; and
   propagating tokens in a single triphone phonetic tree to recognize the received speech signals, wherein propagating tokens comprises:
   initializing the tokens in the phonetic tree;
   propagating the tokens within words of the phonetic tree;
   propagating the tokens between the words of the phonetic tree; and
   merging the tokens.

10. The machine-readable medium of claim 9, further providing instructions, which if executed by a processor, cause the processor to perform the operations comprising:
    propagating the tokens in each node of the phonetic tree.

11. The machine-readable medium of claim 9, wherein the instructions for propagating the tokens between the words of the phonetic tree, which if executed by a processor, cause the processor to perform the operations comprising:
    adding a language model probability to each leaf node token of the phonetic tree;
    generating a new token to remember a new path history by integrating all path history of the tokens; and
    propagating the new token from the leaf node to a root note of a phonetic tree.

12. The machine-readable medium of claim 9, further providing instructions, which if executed by a processor, cause the processor to perform the operations comprising:
    preserving a best matching token and deleting other tokens.

* * * * *